(12) United States Patent
Takeda et al.

(10) Patent No.: US 6,552,317 B1
(45) Date of Patent: Apr. 22, 2003

(54) OPTICAL PICKUP DEVICE

(75) Inventors: Tadashi Takeda, Nagano (JP); Yuichi Takei, Nagano (JP); Yoshio Hayashi, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 40 days.

(21) Appl. No.: 09/592,812

(22) Filed: Jun. 13, 2000

(30) Foreign Application Priority Data

Jun. 16, 1999 (JP) .......................................... 11-169059

(51) Int. Cl.[7] ................................................ G02B 7/04
(52) U.S. Cl. ............... 250/201.5; 250/225; 369/110.02; 369/112.16
(58) Field of Search ............................ 250/225, 201.5, 250/237 G, 237 R; 369/110.01–110.04, 112.16, 112.17, 44.12; 359/566, 569, 494

(56) References Cited

U.S. PATENT DOCUMENTS 5,717,675 A  *  2/1998  Yamamoto ............. 369/110.03
5,739,952 A  *  4/1998  Takeda et al. ............... 359/495
5,855,971 A  *  1/1999  Kobori et al. .................. 428/1

FOREIGN PATENT DOCUMENTS

JP     10-123322    *  5/1998    ............ G02B/5/30
JP     10-162403    *  6/1998    ............ G11B/7/135

OTHER PUBLICATIONS

Serway, Physics for Scientists & Engineers with Modern Physics, 1992, Saunders College Publishing, 3$^{rd}$ Ed., pp. 1087–1088.*

* cited by examiner

*Primary Examiner*—Robert H. Kim
*Assistant Examiner*—Chih-Cheng Glen Kao
(74) *Attorney, Agent, or Firm*—Sughrue Mion, PLLC

(57) ABSTRACT

A phase difference plate (12) converts states of polarization of emergent light form a laser light source (13) and return light form an optical recording medium (5). A diffractive element (21) separates the return light from an optical axis leading from the laser light source (13) to the optical recording medium (5), and guides the return light to a photodetector (14) on the basis of a difference between the states of polarization of the emergent light and the return light. The polarization direction of emergent light from the laser light source (13) is arranged so as to be oriented in the radial direction of the optical recording medium (5) (in the direction of birefringence of the optical recording medium). The azimuth and the amount of phase of the phase difference plate (12) are set so that a peak of a signal in tensity detected by the photodetector (14) appears while an amount of birefringence of the optical recording medium changes from 0 to a quarter wavelength of the laser light when the amount of birefringence of the optical recording medium (5) is changed.

10 Claims, 12 Drawing Sheets

|  | δ |  |  |  |  | EQL |
|---|---|---|---|---|---|---|
| FIG. 12B | 0 | ↗ | ○ | ○ | ↘ | 1.0 |
| FIG. 12C | λ/4 | ↗ | ○ | ↘ | ○ | 0.5 |
| FIG. 12D | λ/2 | ↗ | ○ | ○ | ↗ | 0 |

OPTICAL PICKUP DEVICE

BACKGROUND OF THE INVENTION

The present invention relates to an optical pickup device for effecting the reproduction of an optical recording medium. More particularly, the present invention concerns an optical system for separating emergent light from a light source and return light from the optical recording medium.

As an optical pickup device for effecting the reproduction of an optical recording medium such as a compact disk (CD), an optical pickup device of a polarizing system is known which is arranged to be capable of separating emergent light and return light by causing the emergent light from the laser light source and the return light from the optical recording medium to pass through a quarter-wave phase difference plate (quarter-wave plate). For example, as shown in FIGS. 10 and 11, a device in which a polarizing beam splitter 11 (polarizing and separating element), a phase difference plate 12, and an objective lens 16 are disposed at positions midway in the optical path from a laser light source to a photodetector is arranged such that the light emitted from a laser light source 13 constituted by a laser diode passes through the polarizing beam splitter 11 and the phase difference plate 12, and is then applied to the recording surface of an optical recording medium 5 as a spot of light, while the return light from the optical recording medium 5 passes through the phase difference plate 12 and the polarizing beam splitter 11 again. The return light from the optical recording medium 5, when passing through the phase difference plate 12, is converted to laser light whose polarization direction differs 90° from the polarization direction of the emergent light from the laser light source 13, and is guided to a photodetector 14 disposed in a direction different from that of the laser light source 13 by the polarizing beam splitter 11.

In addition, there are cases in which, as shown in FIGS. 1 and 2, a diffractive element 21 (hologram element) serving as a polarizing and separating element is disposed between the laser light source 13 and the phase difference plate 12, and the return light from the optical recording medium 5 is guided to the photodetector 14 by this diffractive element 21.

In either one of these optical pickup devices 1A and 1B of the polarizing system, as a development of the optical system and the state of polarization of the light are schematically shown in FIGS. 12A and 12B, the linearly polarized light emitted from the laser light source 13 is converted to circularly polarized light by the phase difference plate 12, and the return light (circularly polarized light) from the optical recording medium 5 is converted to linearly polarized light whose polarization direction differs 90° from the polarization direction of the linearly polarized light emitted from the laser light source 13 by the phase difference plate 12, and is guided to the photodetector 14 disposed in a direction different from that of the laser light source 13.

Accordingly, with the optical pickup devices 1A and 1B of this type, there is an advantage in that the emergent light from the laser light source 13 can be applied effectively to the optical recording medium 5, and the return light from the optical recording medium 5 can be guided to the photodetector 14 with high efficiency.

However, in the above-described optical pickup device, the effective quantity of light (represented as EQL in the figure) becomes 100% when the amount of birefringence δ of the optical recording medium 5 is 0. In a case where the optical recording medium 5 itself has birefringence, a change occurs in the polarized state of the light due to this birefringence as well, so that there is the problem that the effective quantity of light drops below 100%.

For example, as shown in FIG. 12C, if the optical recording medium 5 itself has an amount of birefringence δ corresponding to the quarter wavelength in the back-and-forth movement of the light, the light already becomes linearly polarized light when it is reflected by the optical recording medium 5. Consequently, when the return light reflected by the optical recording medium 5 passes through the phase difference plate 12 again, the linearly polarized light becomes circularly polarized light, and the effective quantity of light drops to 50%. Further, as shown in FIG. 12D, if the optical recording medium 5 has an amount of birefringence δ corresponding to the λ/2 (hereinafter, wavelength is represented by λ) in the back-and-forth movement of the light, the return light, when passing through the phase difference plate 12, is converted at this point of time to the linearly polarized light whose polarization direction is the same as that of the linearly polarized light emitted from the laser light source 13. Consequently, the return light and the emergent light from the laser light source 13 cannot be separated from each other, so that the effective quantity of light reaching the photodetector 14 becomes 0%.

The relationship between the amount of birefringence δ of such an optical recording medium 5 and the detected quantity of light can be expressed as the relationship such as the one indicated by the dotted line L0 in FIG. 5. Namely, if the quantity of light detected by the photodetector 14 when the amount of birefringence δ of the optical recording medium 5 is 0 is set as 1, the intensity of the signal detected by the photodetector 14 continues to drop when the amount of birefringence δ of the optical recording medium 5 shifts from 0 to λ/2. When the amount of birefringence δ of the optical recording medium 5 reaches λ/2, the signal intensity becomes 0.

Generally, the substrate of the optical recording medium 5 is fabricated by injection molding, and since the resin flows radially outward from the central side of the optical recording medium 5, the optical recording medium 5 is likely to have birefringence whereby the refractive index differs between the radial direction and the circumferential direction. When the signal intensity was measured from the central side to the radially outward side of the optical recording medium 5 to confirm its actual state, there was an optical recording medium exhibiting the characteristic shown in FIG. 13 as an example which exhibited extreme birefringence. In the characteristic shown in FIG. 13, the signal intensity was initially at an extremely low level on the central side of the disk, and exhibited a minimum value at a position offset slightly toward the radially outward side therefrom, and the signal intensity became gradually higher in a region extending from that position toward the radially outermost side. If consideration is given on the basis of this result, it can be seen that, in the disk having the characteristic shown in FIG. 13, there is a region P where the amount of birefringence δ is λ/2 on the slightly radially outward side from the center, and that the amount of birefringence dδ becomes gradually smaller on the further radially outward side. Although this example is an extreme one, it can be estimated that disks which are manufactured by the same manufacturing method show a similar tendency, and it is conceivable that such disks generally have certain quantities of birefringence in the entire radial direction.

In contrast, it is conceivable to use an optical pickup device which is arranged such that the optical recording medium 5 itself and the phase difference plate 12 function as a single phase difference plate by orienting the direction of the anisotropic axis (hereinafter simply referred to as the azimuth) of the phase difference plate 12 in the direction of the birefringence of the optical recording medium 5, and in which, instead of the quarter-wave phase difference plate, a phase difference plate having a phase difference with the amount of phase difference offset from the quarter wavelength by a portion corresponding to the amount of birefringence of the optical recording medium 5 itself is used as the phase difference plate 12.

If such an arrangement is adopted, since the phase difference plate 12 and the optical recording medium 5 itself together function as a quarter-wave phase difference plate, even if the optical recording medium 5 has birefringence, the light emitted from the laser light source 13, after the transmittance of the return light through the phase difference plate 12, is converted to linearly polarized light whose polarization direction differs 90° from that of the emergent light from the laser light source 13. Accordingly, even if the optical recording medium 5 has birefringence, it is possible to configure an optical pickup device having a high effective quantity of light.

In a case where such an arrangement is adopted, it is the general practice to set the polarization direction of the laser light emitted from the laser light source 13 and the axial direction of the phase difference plate 12 at an angle of 45°. Such a setting is generally effected by rotating the laser light source 13 about the optical axis of the emergent light to adjust its angular position. However, with such an adjustment method, the laser light source 13 can be rotated singly about the optical axis of the emergent light in the case where the laser light source 13 and the photodetector 14 are formed separately, as shown in FIGS. 10 and 11. However, such an adjustment method cannot be adopted in the case where the laser light source 13 is formed integrally with the photodetector 14 as a light source unit 20 as in the case of the optical pickup device 1A shown in FIGS. 1 to 3. Hence, there is a problem in that a large restriction is imposed on the layout of the optical system.

SUMMARY OF THE INVENTION

In view of the above-described problems, an object of the invention is to provide an optical pickup device which is capable of effecting stable optical detection without imposing a large restriction on the layout of the optical system even if the optical recording medium itself has birefringence.

According to the invention, the phase difference and azimuth of the phase difference plate are set so that a peak of the signal intensity appears in the photodetector while the amount of birefringence of the optical recording medium changes from 0 to $\lambda/4$ without placing a precondition on aligning the azimuth of the phase difference plate with the direction of birefringence of the optical recording medium.

In addition, the optical recording medium is irradiated through the phase difference plate whose azimuth is oriented in a range of 50° to 60° with respect to laser light emitted from the laser light source.

Further, the polarization direction of emergent light from the laser light source is arranged so as to be oriented at 45° with respect to the radial direction of the optical recording medium, and the azimuth of the phase difference plate is offset in a range of about 5° to 15° with respect to the 45°.

Accordingly, in the invention, even if the azimuth of the phase difference plate is not oriented in the direction of birefringence of the optical recording medium, the return light from the recording medium can be detected with high intensity in the range in which the amount of birefringence of the optical recording medium is between 0 to $\lambda/4$. Therefore, it is possible to arrange an optical pickup device with a high effective quantity of light. In addition, the light source can be arranged in an optimal state in view of the design feature and the like irrespective of in whichever direction the birefringence of the optical recording medium is actually oriented. Accordingly, even in the optical pickup device in which the light source and the photodetector are integrally formed, stable signal detection can be effected by absorbing the birefringence of the optical recording medium.

BRIEF DESCRIPTION OF THE DRAWINGS

In the accompanying drawings:

FIGS. 12B to 12D are explanatory diagrams schematically illustrating the amount of back-and-forth birefringence of the optical recording medium itself and the polarized state of the light, respectively.

DETAILED DESCRIPTION OF THE PREFERRED EMBODIMENTS

Figure 1:
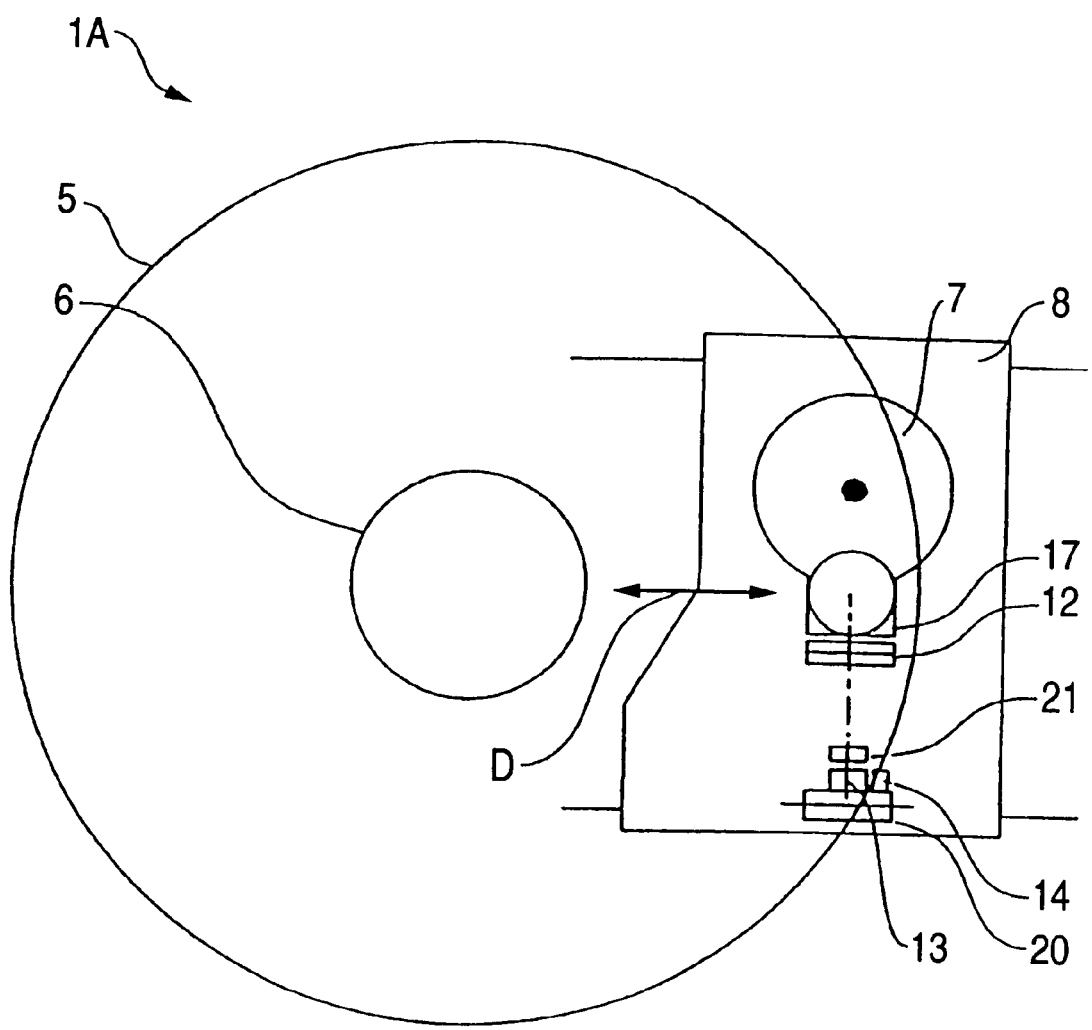
FIG. 1 is an explanatory diagram schematically illustrating the planar layout of essential portions of an optical disk drive apparatus using a diffractive element as a polarizing and separating element of an optical pickup device.

Referring to the drawings, a description will be given of the embodiments of the invention. It should be noted that although a description will be given below of an example in which a diffractive element is used as a polarizing and separating element, the basic configuration of the optical pickup device in this first embodiment is common to that of the optical pickup device described with reference to FIGS. 9 and 10, so that corresponding elements will be denoted by the same reference numerals, and a description thereof will be omitted.

Figure 2:
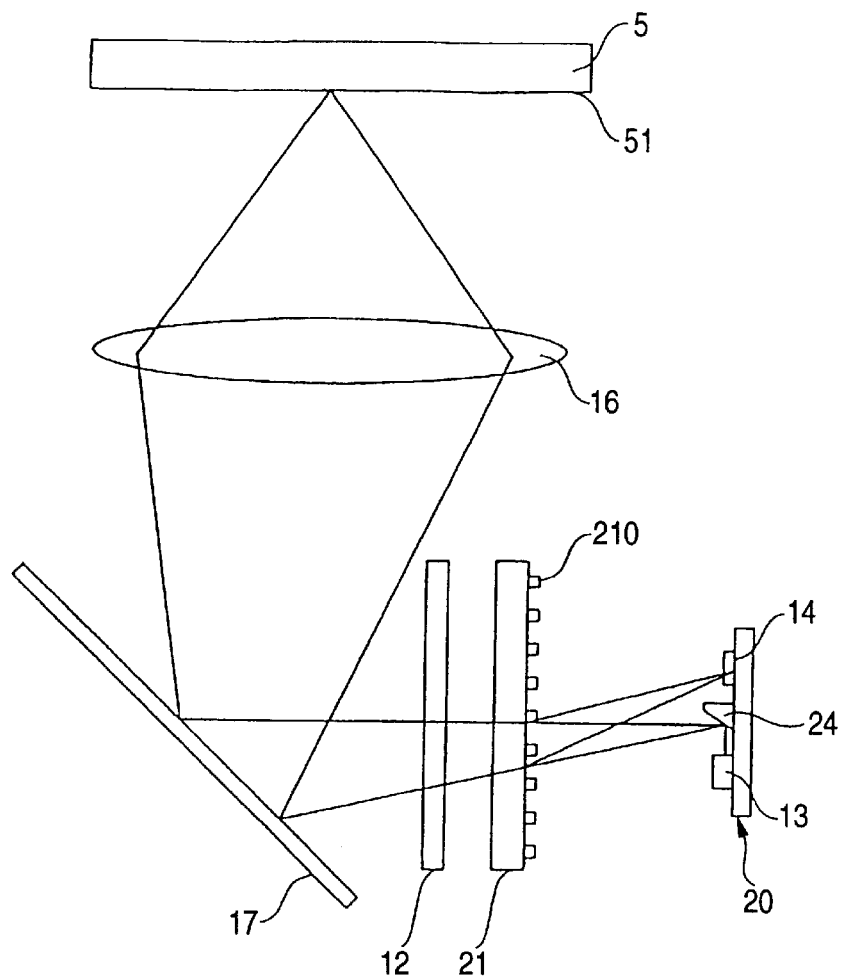
FIG. 2 is an explanatory diagram schematically illustrating the layout of an optical system of the optical pickup device used in the optical disk drive apparatus shown in FIG. 1.

FIGS. 1 and 2 are an explanatory plan view of essential portions of an optical disk drive apparatus to which the invention is applied, and an explanatory diagram illustrating the layout of its optical system.

As shown in FIGS. 1 and 2, the optical disk drive apparatus comprises a motor 6 for rotatively driving an optical recording medium (optical recording disk) 5 and an optical pickup device 1A for reading information from the optical recording medium 5. As an optical system of the optical pickup device 1A, a diffractive element 21 (a hologram element or a polarizing and separating element) having a polarizing characteristic, a phase difference plate 12, an upwardly reflecting mirror 17, and an objective lens 16 are arranged in that order on an optical path leading from a laser light source 13 constituted by a laser diode to a recording surface 51 of the optical recording medium 5. Further, a photodetector 14 constituted by a photodiode is disposed in the vicinity of the laser light source 13. A lens actuator 7 for driving the objective lens 16 in a tracking direction and a focusing direction is formed for the objective lens 16 in a conventional manner, and the lens actuator 7 and the optical system are mounted on a frame 8 which is movable in the radial direction of the optical recording medium 5.

Figure 3A:
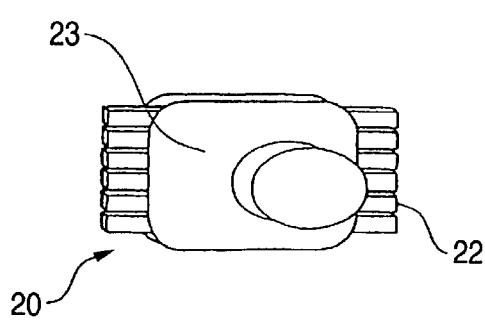
FIGS. 3A and 3B are a perspective view illustrating the external appearance of a light source unit used in the optical pickup device shown in FIG. 2, and a plan view illustrating its internal structure, respectively.
Figure 3B:
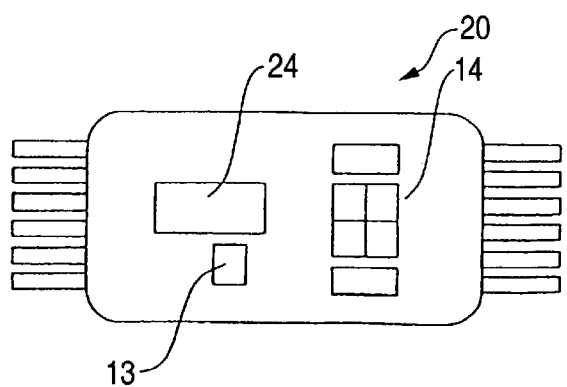

FIGS. 3A and 3B are a perspective view illustrating the external appearance of a light source unit used in the optical pickup device shown in FIG. 2, and a plan view illustrating its internal structure, respectively.

As shown in FIGS. 3A and 3B, the laser light source 13 is formed on the same substrate as that of the photodetector 14 as a light source unit 20. In this light source unit 20, a plurality of leads 22 project from a package 23. Formed on a substrate inside the package 23 are the laser light source 13 constituted by the laser diode, a mirror 24 for upwardly reflecting laser light emitted from the laser light source 13 by 90°, and the photodetector 14 constituted by a split-type photodiode formed on the side of the laser light source 13.

In FIG. 2, a diffraction grating 210 is formed on one surface of the diffractive element 21, and this diffraction grating 210 diffracts only ordinary light, and causes extraordinary light to pass therethrough as it is. As such a diffractive element 21, it is possible to use various types of elements which will be described later, but it is also possible to use one in which lithium niobate is subjected to proton exchange.

Since the diffractive element 21 of this type is well-known, a detailed description thereof will be omitted, but the diffraction grating 210 is formed on the surface of a crystal plate of lithium niobate, which is a birefringent crystal substrate. In this diffraction plate 210, proton-ion exchange regions each having a fixed width and depth are formed in the form of a grating on the surface of the crystal plate of lithium niobate which is the birefringent crystal plate. Non-proton-iron exchange regions where proton-ion exchange does not take place remain between adjacent ones of the proton-ion exchange regions. A dielectric film of a fixed thickness, e.g., an $SiO_2$ film, is formed on the surface of each non-proton-ion exchange region, and the surfaces of the proton-ion exchange regions are exposed as they are. Here, the proton-ion exchange regions and the non-proton-ion exchange regions are alternately (periodically) formed on the surface of the crystal plate of lithium niobate. In the proton-ion exchange regions of the crystal plate, the refractive index ne with respect to extraordinary light increases by 0.11 or thereabouts with respect to the non-proton-ion exchange regions, whereas the refractive index $n_o$ with respect to ordinary light conversely decreases by 0.04 or thereabouts.

Here, to prevent the extraordinary light from being subjected to the action of diffraction, the dielectric film of a predetermined thickness is formed on the surface of each non-proton-ion exchange region, so that the phase difference occurring when the extraordinary light passes through the proton-ion exchange regions and the non-proton-ion exchange regions is offset. When the ordinary light passes through the proton-ion exchange regions, the phase advances. However, when the ordinary light passes through the non-protonion exchange regions, the phase relatively lags, and the phase further lags due to the dielectric film formed on their surfaces. Accordingly, when the ordinary light passes through the diffractive element 21, a phase difference occurs, and the ordinary light is subjected to the action of diffraction. In contrast, when extraordinary light components pass either region, phase shifts which they receive are identical, the extraordinary light components travel rectilinearly as they are without being subjected to the action of diffraction, and pass through the regions.

With the optical pickup device 1A constructed as described above, basically, after the laser light is emitted from the laser light source 13, the linearly polarized light which passed through the diffractive element 21 is converted to the circularly polarized light by the phase difference plate 12, and the return light (circularly polarized light) from the optical recording medium 5 is converted by the phase difference plate 12 to the linearly polarized light whose polarization direction differs 90° from that of the linearly polarized light emitted from the laser light source 13. Thus the diffractive element 21 guides the return light to the photodetector 14 disposed in a direction different from that of the laser light source 13.

The above-described basic principle holds without a problem in the case where the optical recording medium 5 has not birefringence. However, as already described, since the optical recording medium 5 used in the optical pickup device 1A is generally formed such that resin flows radially outward from the inner peripheral side when the substrate is manufactured by injection molding, the optical recording medium 5 has radial birefringence, as indicated by arrow D in FIG. 1. Accordingly, in the invention, two measures which will be described hereunder are adopted to prevent the decline in the detection sensitivity ascribable to the birefringence.

Figure 4:
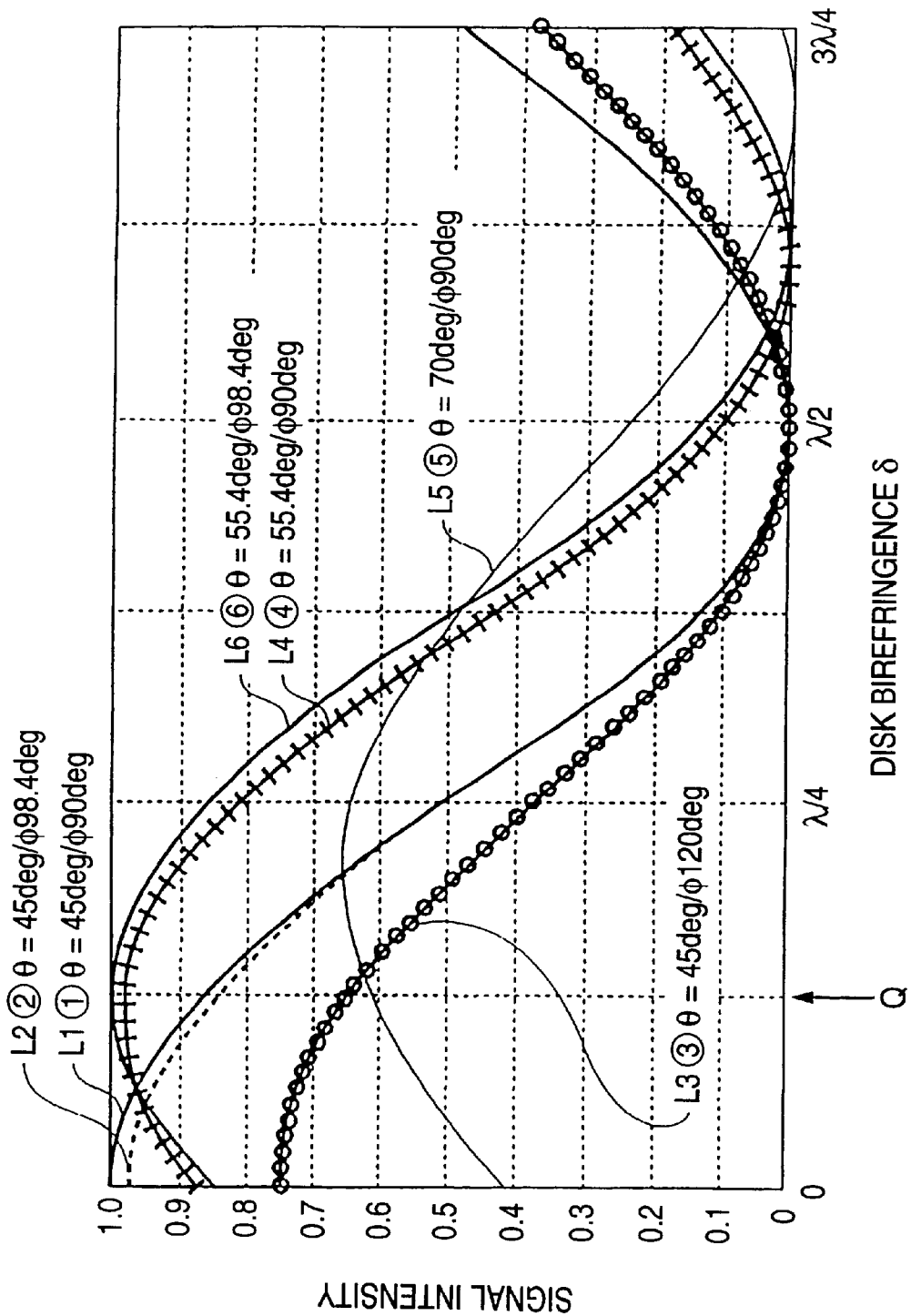
FIG. 4 is a graph illustrating the relationship between the amount of birefringence of an optical recording medium and the intensity of a signal detected by a photodetector when the amount of phase difference and the azimuth of a phase difference plate are changed in the optical pickup device shown in FIG. 2.
Figure 5:
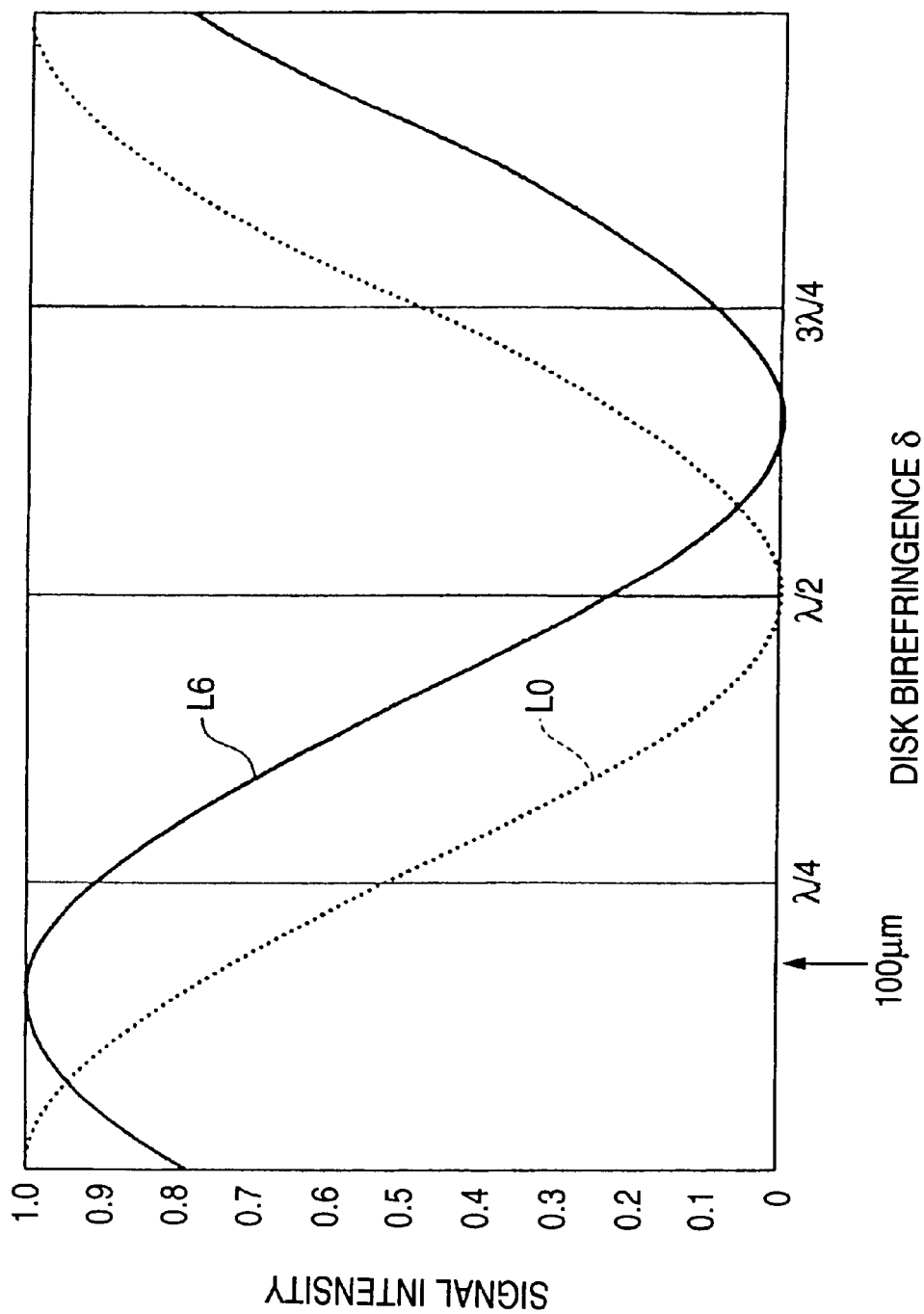
FIG. 5 is a graph illustrating the relationship between the amount of birefringence of the optical recording medium and the intensity of the signal detected by the photodetector, and illustrates an effect obtained by the optical pickup device according to the first embodiment.
Figure 6:
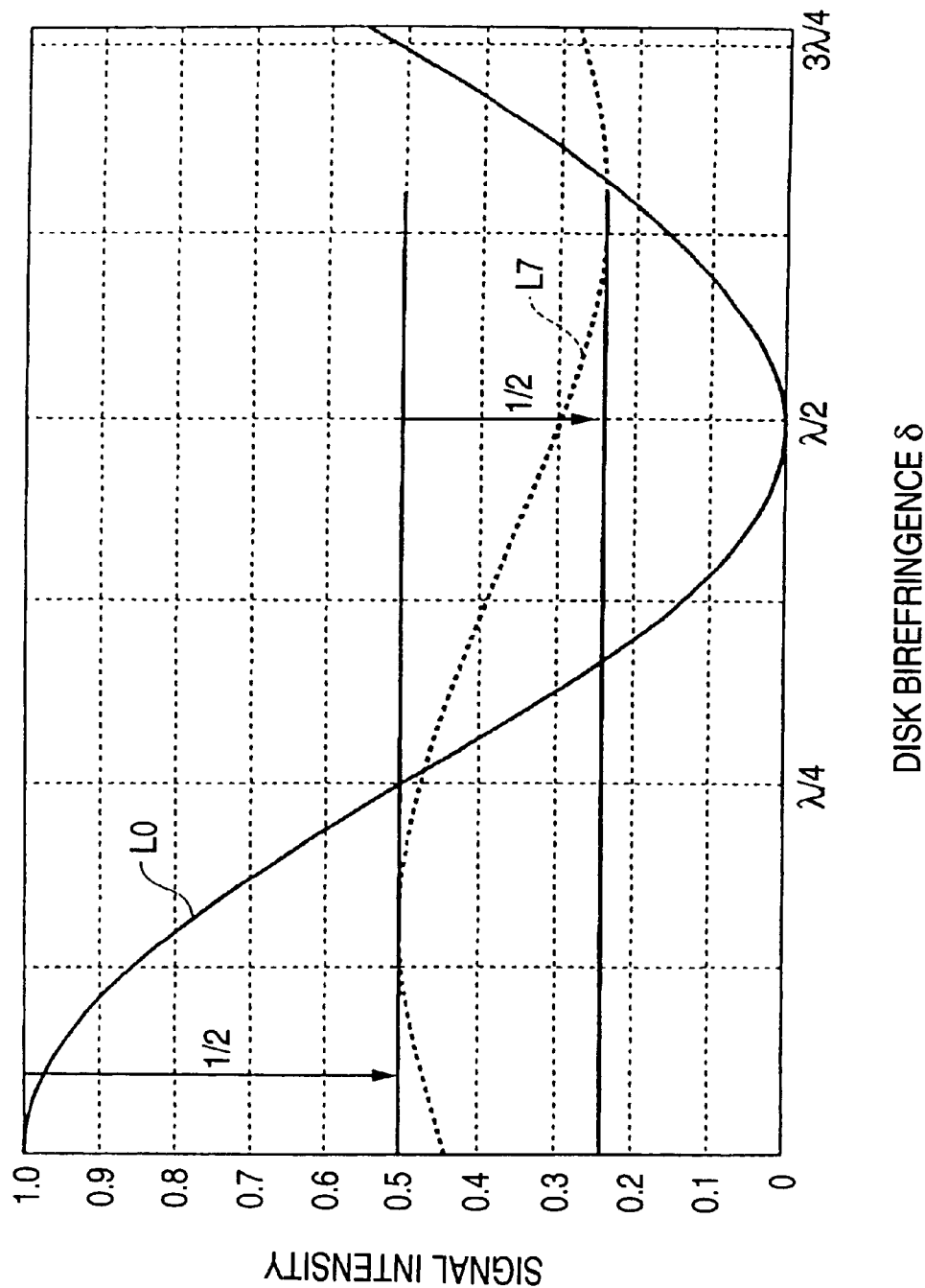
FIG. 6 is a graph illustrating the relationship between the amount of birefringence of the optical recording medium and the intensity of the signal detected by the photodetector, and illustrating an effect obtained by the optical pickup device according to the first and second embodiments.

FIG. 4 is a graph illustrating the relationship between the amount of birefringence of the optical recording medium and the intensity of the signal detected by the photodetector when the amount of phase difference and the azimuth of the phase difference plate are changed in the optical pickup device shown in FIG. 2. FIG. 5 is a graph illustrating the relationship between the amount of birefringence of the optical recording medium and the intensity of the signal detected by the photodetector, and illustrates an effect obtained when the first measure, which will be described later, was adopted in the optical pickup device shown in FIG. 2. FIG. 6 is a graph illustrating the relationship between the amount of birefringence of the optical recording medium and the intensity of the signal detected by the photodetector, and illustrates an effect obtained when the first and second measures, which will be described later, were adopted in the optical pickup device shown in FIG. 2.

First, as for the first measure, the light source unit 20 is disposed in an attitude which is designed under the assumption that the optical recording medium 5 has radial birefringence even though the actual orientation of the direction of birefringence of the optical recording medium 5 may be unknown. Namely, the light source unit 20 is disposed such that the polarization direction of the laser light emitted from the laser light source 13 is oriented at an angle of 45° with respect to the radial direction of the optical recording medium 5. Further, the diffractive element 21 is disposed in a direction conforming to the light-receiving position of the photodetector 14 disposed on the light source unit 20. Next, as for the phase difference plate 12, the phase difference $\Phi$ and the azimuth $\theta$ of the phase difference plate 12 are set such that, when the amount of birefringence of the optical recording medium 5 is changed from 0 to $\lambda/4$ (assuming that the amount of birefringence is present in a range of 0 to $\lambda/4$), a peak of the signal intensity detected by the detector 14 appears during that time.

In setting the phase difference $\Phi$ and the azimuth $\theta$ of the phase difference plate 12 under such conditions, the signal intensity was measured by using the following examples of the phase difference plate 12:

Example 1 the phase difference $\Phi=90°$ and the azimuth $\theta=45°$ of the phase difference plate 12

Example 2 the phase difference $\Phi=98.4°$ and the azimuth $\theta=45°$ of the phase difference plate 12

Example 3 the phase difference $\Phi=120°$ and the azimuth $\theta=45°$ of the phase difference plate 12

Example 4 the phase difference $\Phi=90°$ and the azimuth $\theta=55.4°$ of the phase difference plate 12

Example 5 the phase difference $\Phi=90°$ and the azimuth $\theta=70°$ of the phase difference plate 12

Example 6 the phase difference $\Phi=98.4°$ and the azimuth $\theta=55.4°$ of the phase difference plate 12

The results of measurement of the signal intensity when the amount of birefringence of the optical recording medium 5 was changed from 0 to a $3\lambda/4$ portion by using these examples are shown in FIG. 4. Here, data of the examples 1 to 6 are respectively shown by lines L1 to L6 in FIG. 4.

As is apparent from the results shown in FIG. 4, if the phase difference $\Phi$ and the azimuth $\theta$ of the phase difference plate 12 are changed, the relationship between the amount of birefringence of the optical recording medium 5 and the signal intensity changes.

However, as the characteristics of the examples 2 and 3 are shown by lines L2 and L3 in FIG. 4, it can be seen that the peak of the signal intensity does not appear while the amount of birefringence of the optical recording medium 5 is changed from 0 to $\lambda/4$ in cases where only the phase difference $\Phi$ of the phase difference plate 12 is changed from 90° to 98.4° and 120° with the azimuth $\theta$ of the phase difference plate 12 kept at 45° by using the example 1 (its characteristic is shown by line L1 in FIG. 4) corresponding to the related example as a reference.

In addition, as the characteristic of the example 5 is shown by line L5 in FIG. 4, although the peak of the signal intensity appears, the signal intensity drops while the amount of birefringence of the optical recording medium 5 is changed from 0 to $\lambda/4$ in the case where the azimuth $\theta$ of the phase difference plate 12 is changed to 70° with the phase difference $\Phi$ of the phase difference plate 12 kept at 90° by using the example 1 which is the related example as a reference.

In contrast, as the characteristic of the example 4 is shown by line L4 in FIG. 4, the peak of the signal intensity appears, and a high signal intensity can be obtained while the amount of birefringence of the optical recording medium 5 is changed from 0 to $\lambda/4$ in the case where the azimuth $\theta$ of the phase difference plate 12 is set to 55.4° with the phase difference $\Phi$ of the phase difference plate 12 kept at 90° by using the example 1 which is the related example as a reference.

In addition, as the characteristic of the example 6 is shown by line L6 in FIG. 4, the peak of the signal intensity appears, and a high signal intensity can be obtained while the amount of birefringence of the optical recording medium 5 is changed from 0 to $\lambda/4$ in the case where the azimuth $\theta$ of the phase difference plate 12 is set to 55.4° and the phase difference $\Phi$ of the phase difference plate 12 is set to 98.4° by using the example 1 which is the related example as a reference. Moreover, with the example 6, the birefringence exhibits a peak of the signal intensity at the position Q of the $\lambda/8$ which is expected to be most likely in the optical recording medium 5. Therefore, if the optical pickup device 1B is configured so as to correspond to this example 6, as data of the example 1 which is a related example and data of the example 6 which is a most preferred embodiment of the invention are shown in comparison in FIG. 5, a peak appears in the signal intensity while the birefringence of the optical recording medium 5 is changed from 0 to $\lambda/2$. Therefore, in a range of conditions which is narrower than the range in which the birefringence of the optical recording medium 5 is between 0 and $\lambda/2$, it becomes possible to prevent the occurrence of an error ascribable to the presence of birefringence in the optical recording medium 5.

It should be noted that, as described above, the range in which the peak of the signal intensity appears and the signal intensity is highest while the amount of birefringence of the optical recording medium 5 changes from 0 to the λ/4 is the range in which the azimuth θ of the phase difference plate 12 is set in. the range of 50° to 60°, and the phase difference Φ of the phase difference plate 12 is set within the range of about 20° with 90° set as the center.

However, with the optical pickup device 1A constructed as described above, as shown in FIG. 4, there are conditions in which the signal intensity becomes 0 while the birefringence of the optical recording medium 5 is changed from λ/2 to 3λ/4. Generally, the birefringence of the optical recording medium 5 is considered to be in the range of 0 to λ/4, but the following measure may be adopted as a second embodiment to be able to cope with cases in which the birefringence of the optical recording medium 5 is between λ/2 and 3λ/4.

The second measure in the invention is to arrange the diffractive element 21 used as the polarizing and separating element so as to be provided with a partially polarizing characteristic whereby s polarized light (first linearly polarized light) and p polarized light (second linearly polarized light) whose polarization directions are oriented in mutually perpendicular directions are separated from the return light, including the s polarized light and the p polarized light, toward the photodetector 14 at a fixed ratio except zero respectively.

Namely, if, in the diffractive element 21, the transmittance and the diffraction rate with respect to the s polarized light are set as Ts and Rs, the ratio between the transmittance Ts and the diffraction rate Rs with respect to the s polarized light, which was 0:1, is set to 0.5:0.5 as the ratio between the transmittance Ts and the diffraction rate Rs with respect to the s polarized light. To put it differently, if the transmittance and the diffraction rate with respect to the p polarized light are set as Tp and Rp, the ratio between the transmittance Tp and the diffraction rate Rp with respect to the p polarized light, which was 1:0, is set to 0.5:0.5 as the ratio between the transmittance Tp and the diffraction rate Rp with respect to the p polarized light.

Figure 10:
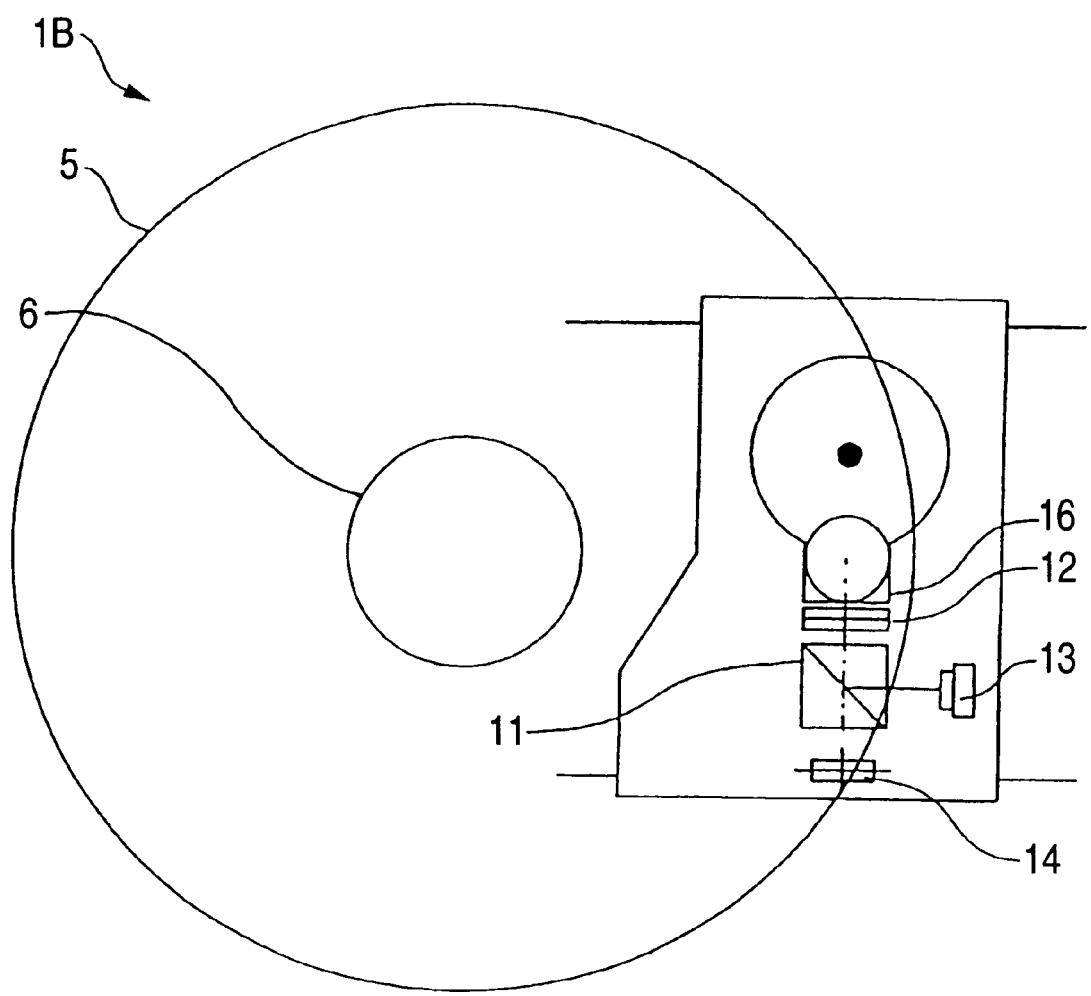
FIG. 10 is an explanatory diagram schematically illustrating the planar layout of essential portions of the optical disk drive apparatus using a cubic prism-shaped polarizing beam splitter as the polarizing and separating element of the optical pickup device.
Figure 11:
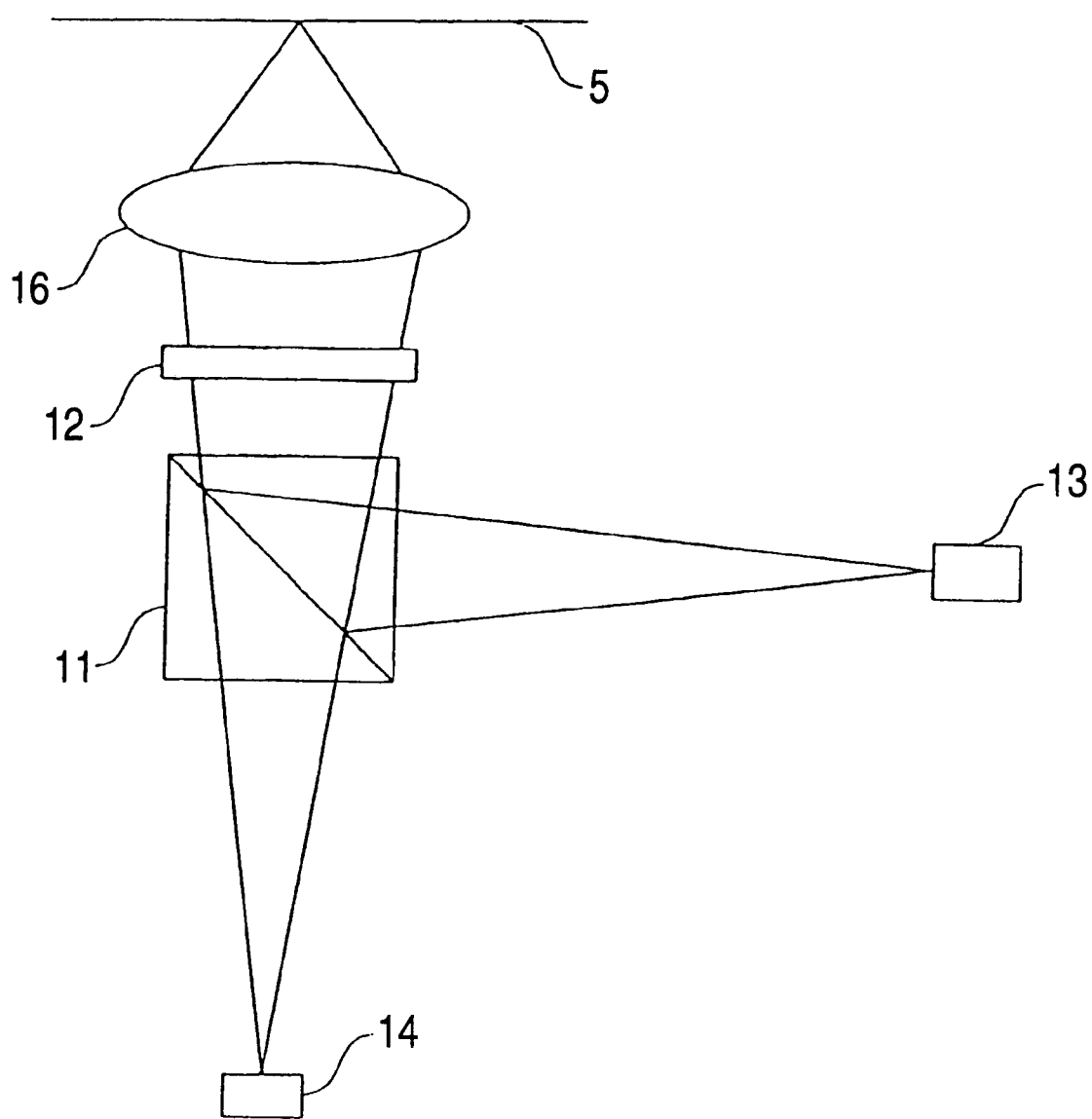
FIG. 11 is an explanatory diagram schematically illustrating the layout of the optical system of the optical pickup device used in the optical disk drive apparatus shown in FIG. 10.
Figure 12A:
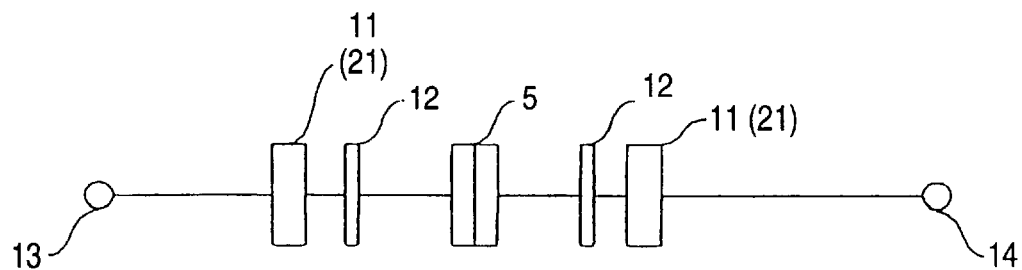
FIGS. 12A is a development view of the optical system constructed in the optical pickup device.
Figure 13:
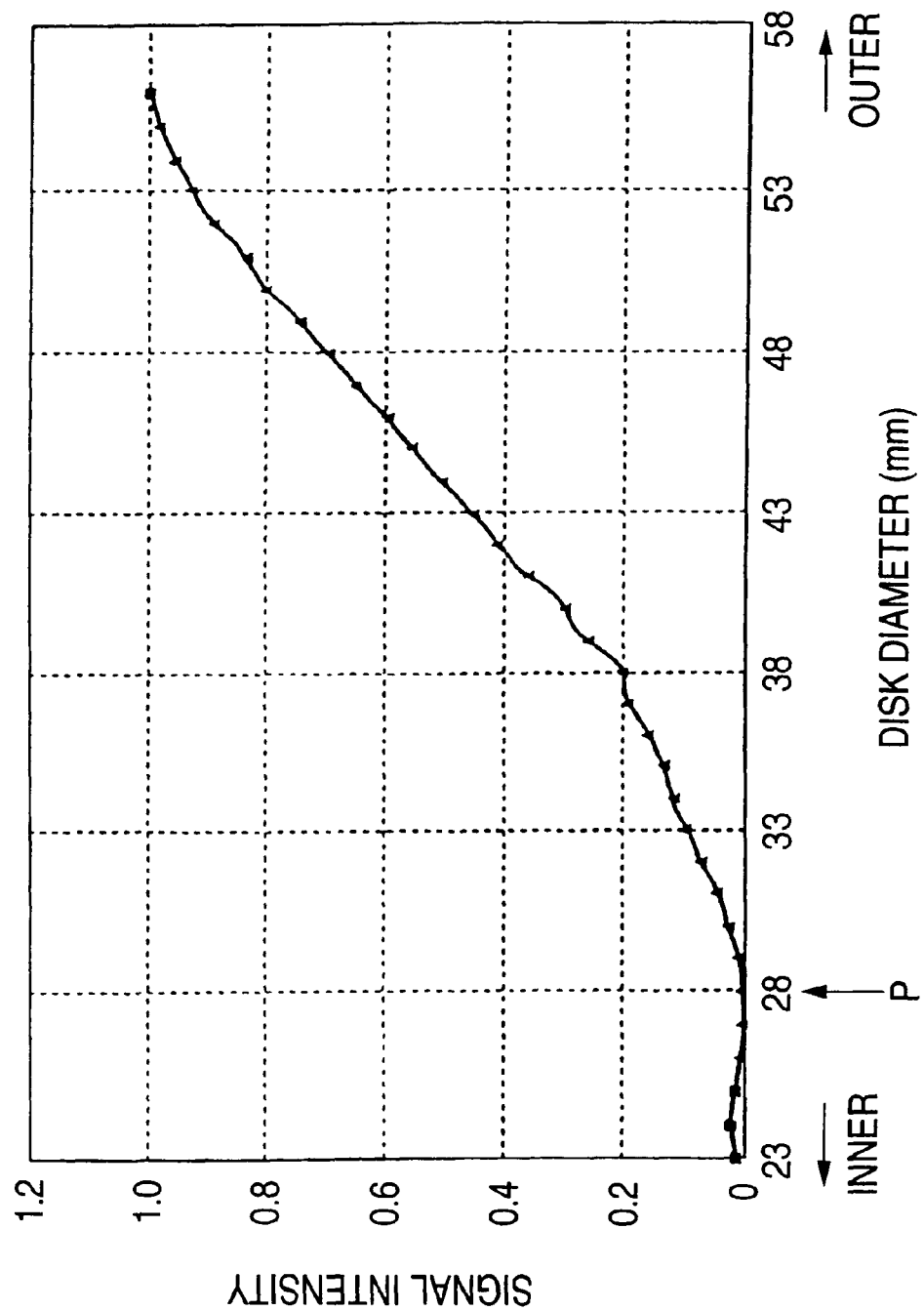
FIG. 13 is a graph illustrating the relationship between a radial position in the optical recording medium and the intensity of a signal detected therefrom by the photodetector.

For example, in a case where a polarizing beam splitter 11 constituted by a cubic prism is used as the polarizing and separating element of the optical pickup device as shown in FIGS. 10 and 11, if the transmittance and the diffraction rate with respect to the s polarized light are set as Ts and Rs, the ratio between the transmittance Ts and the diffraction rate Rs with respect to the s polarized light is set to 0.5:0.5. To put it differently, if the transmittance and the diffraction rate with respect to the p polarized light are set as Tp and Rp, the ratio between the transmittance Tp and the diffraction rate Rp with respect to the p polarized light is set to 0.5:0.5.

It should be noted that the ratio between the transmittance T and the diffraction rate R is preferably set identically to 0.5:0.5. However, the ratio may not be identical, and it is desirable to secure a fixed ratio as required in design, i.e., substantially 0.3 or more for both rates.

Accordingly, with the optical pickup device 1A of this embodiment, as shown by dotted line L7 in FIG. 6, both the s polarized light and the p polarized light are included in the return light incident upon the diffractive element 21 due to the birefringence of the optical recording medium 5, and portions of the polarized light are respectively incident upon the photodetector 14. Accordingly, in a case where all the polarized light included in the return light is, for example, the s polarized light, the signal intensity level is suppressed to some extent. Nevertheless, even if all the polarized light included in the return light is the p polarized light due to the birefringence of the optical recording medium 5, it is possible to detect the signal with a certain degree of intensity. Here, as the optical pickup device 1A, there is no problem if the detected signal intensity is high to some extent when the return light is detected.

Accordingly, even under the conditions in which the signal intensity would become 0 in a related case, the signal can be detected with a high level to some extent. Therefore, even in a case where only the p polarized light is included in the return light due to the fact that the optical recording medium 5 has birefringence, a signal at a certain level or higher can be always detected by the partially polarizing characteristic of the diffractive element 21. Hence, not matter what birefringence the optical recording medium 5 may have, the signal detection can be effected reliably.

Although in the above-described embodiment an arrangement is used in which the diffractive element 21 serving as the polarizing and separating element and the phase difference plate 12 are formed separately, it is possible to use a combined optical element 25 in which a polarizing and separating element such as the cubic prism-shaped polarizing beam splitter 11 is formed integrally with the phase difference plate 12. If such an arrangement is adopted, since it is sufficient to handle the diffractive element 21 or the cubic prism-shaped polarizing beam splitter 11 and the phase difference plate 12 as the combined optical element 25, it is possible to attain high efficiency in the operation of assembling the optical pickup device, high efficiency in the operation of adjusting the direction of birefringence of the diffractive element 21 and the azimuth of the phase difference plate 12, and compact size of the components. In forming such a combined optical element 25, there is a method in which after the polarizing and separating element such as the diffractive element 21 and the phase difference plate 12 are formed separately, these members are bonded together by an adhesive agent.

In addition, if the combined optical element 25 is formed by forming the phase difference plate 12 on the diffractive element 21 or the cubic prism-shaped polarizing beam splitter 11, it is possible to attain a reduction in the cost of parts in addition to attaining high efficiency in the operation of assembling the optical pickup device, high efficiency in the operation of adjusting the direction of birefringence of the diffractive element 21 and the azimuth of the phase difference plate 12, and compact size of the components.

Figure 7A:
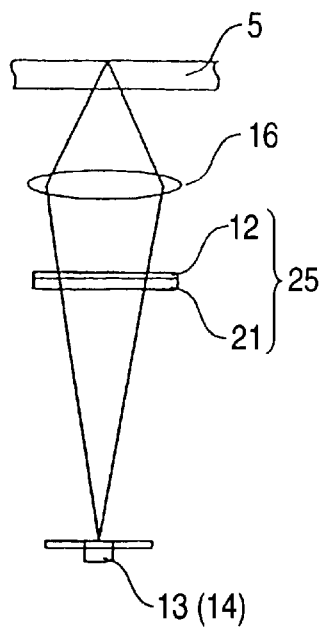
FIGS. 7A to 7C are an explanatory diagram illustrating essential portions of the optical system of the optical pickup device using a combined optical element in which the phase difference plate and the diffractive element are integrally formed, an explanatory diagram illustrating the structure of the combined optical element, and an explanatory diagram illustrating the manner in which a dielectric film is obliquely vapor-deposited to fabricate the combined optical element, respectively.
Figure 7B:
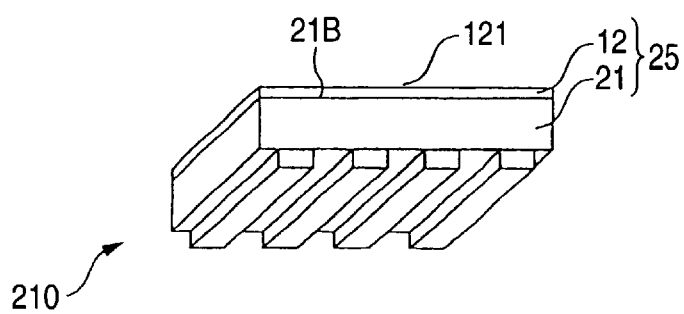
Figure 7C:
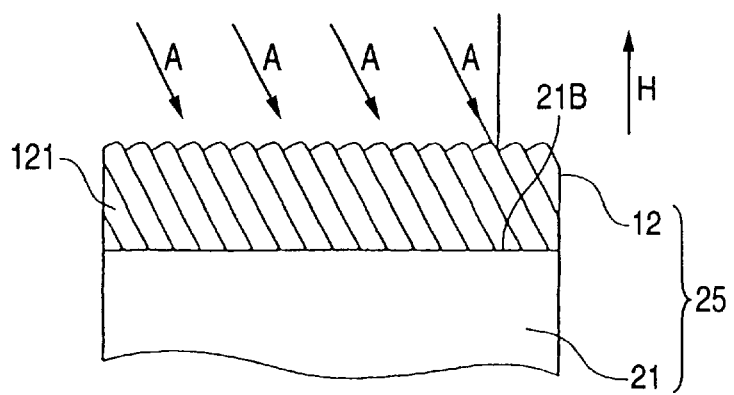

To fabricate such a combined optical element 25, as shown in FIGS. 7B and 7C, a dielectric film 121 is obliquely vapor-deposited on a surface 21B opposite to the side where the diffraction grating 210 is formed, of the two surfaces of the diffractive element 21, and the phase difference plate 12 is formed by this dielectric film 121. In this case, an inorganic oxide, such as tantalum pentoxide, tungsten oxide, bismuth trioxide, and titanium oxide, is obliquely vapor-deposited from the direction of arrow A which forms a predetermined angle with respect to the normal direction H of the diffractive element 21. As for the birefringent film 121 formed of a dielectric film thus formed, by setting the angle formed by, for instance, the normal direction H and the crystal axis to, for instance, 70° and by adjusting the film thickness, the obliquely vapor-deposited birefringent film 121 performs optical function as the phase difference plate 12. If the angle formed by the normal direction H and the crystal axis and the film thickness are adjusted, it is possible to form not only the quarter-wave phase difference plate but also various types of phase difference plate 12. The amount of phase difference in this case can be controlled by the thickness of the vapor-deposited film, and the azimuth can be controlled by the direction of vapor deposition.

Figure 8A:
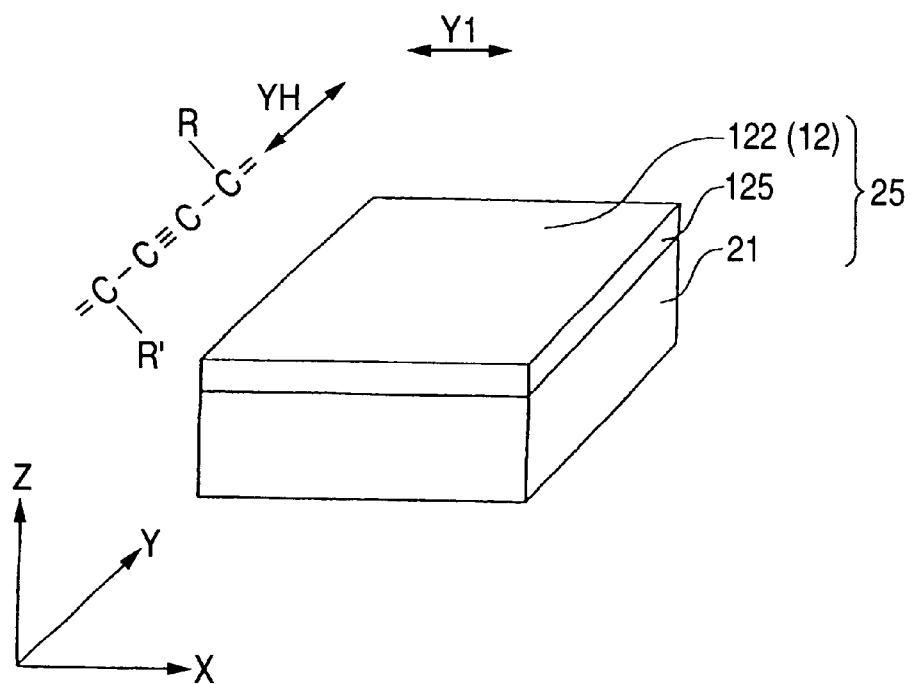
FIGS. 8A and 8B are an explanatory diagram illustrating the structure of a combined optical element in which a phase difference plate using a polydiacetylene derivative film and the diffractive element are integrally formed, and an explanatory diagram illustrating the basic principle of this phase difference plate, respectively.

Further, to form the phase difference plate 12 on the diffractive element 21, a polydiacetylene derivative film may be used instead of the oblique vapor deposition of the dielectric film. In this case, as shown in FIG. 8A, after, for example, a polyethylene terephthalate film (PET film) 125 or a polyimide film is coated with a predetermined thickness on the reverse surface of the diffractive element 21, rubbing processing is effected by using polyester or other similar fibers. Then, a polydiacetylene derivative film 122 having birefringence is formed on the surface of the PET film 125 by a vacuum deposition process. Here, as can be seen from FIG. 8A, the polydiacetylene derivative film 122 is oriented in the X-Y plane in accordance with the direction of rubbing of the PET film 125, and the direction of the principal chain (the direction of orientation) is in the Y-axis direction as indicated by arrow YH. The polydiacetylene derivative film 122 thus formed exhibits birefringence, and the refractive index $n_e$ in the orientation direction YH and the refractive index $n_o$ in a direction YI perpendicular to the orientation direction YH are different. Here, if the thickness d of the polydiacetylene derivative film 122 is determined so as to satisfy the following formula:

$$2\pi \Delta n \cdot d / \lambda = \pi/2,$$

then the phase difference plate 12 can be formed.

It should be noted that $\lambda$ and $\Delta n$ in the above formula respectively denote the wavelength of the light incident upon the polydiacetylene derivative film 122 and the difference ($n_e - n_o$) in the refractive index between extraordinary light and ordinary light. The extraordinary light is the polarized light which oscillates in the orientation direction YH of the polydiacetylene derivative film 122, while the ordinary light is the polarized light which oscillates in the direction YI perpendicular to the orientation direction YH of the polydiacetylene derivative film 122.

Figure 8B:
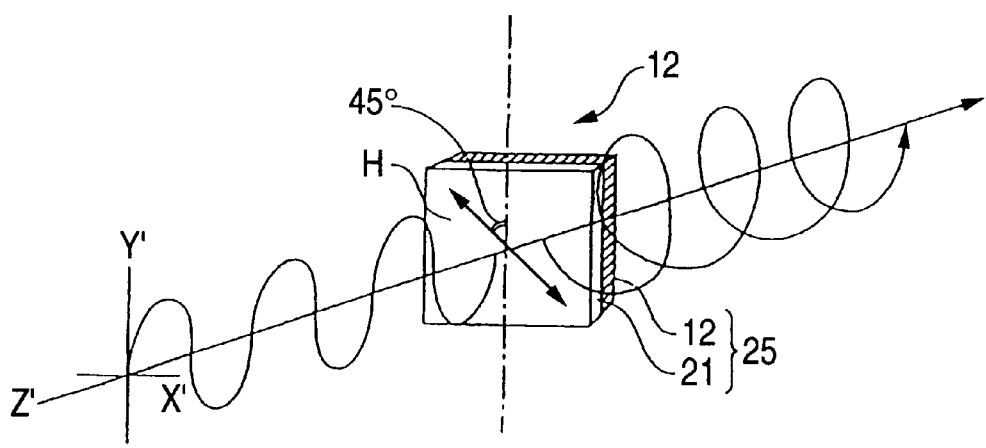

If such a polydiacetylene derivative film 122 is disposed by being tiled such that the orientation direction YH of the polydiacetylene derivative film 122 is oriented at 45° with respect to a Y' axis in an X'-Y' plane with respect to the linearly polarized light which travels while oscillating in the Y'-axis direction in a Y'-Z' plane as shown in FIG. 8B, the linearly polarized light incident upon the phase difference plate 12 undergoes a phase difference of a quarter wavelength between a component in the orientation direction YH and a component perpendicular to the orientation direction YH, and is made emergent as circularly polarized light. When this circularly polarized light is reflected by the optical recording medium and passes through the polydiacetylene derivative film 122 again, the light is made emergent as linearly polarized light whose oscillation direction differs 90° from that of the initially incident linearly polarized light. Namely, the phase difference plate 12 also functions as a quarter-wave plate. In addition, if the film thickness is adjusted, it is possible to form various types of phase difference plate. With the phase difference plate 12 thus formed, the azimuth can be controlled by the rubbing direction, and the amount of phase can be controlled by the film thickness.

Figure 9A:
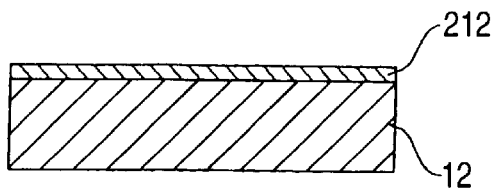
FIGS. 9A to 9D are cross-sectional views of a process for fabricating the combined optical element by forming on the phase difference plate the diffractive element having a partially polarizing characteristic and using the polydiacetylene derivative film.
Figure 9B:
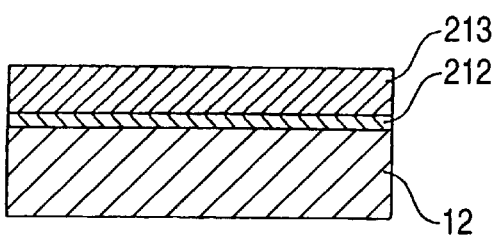
Figure 9C:
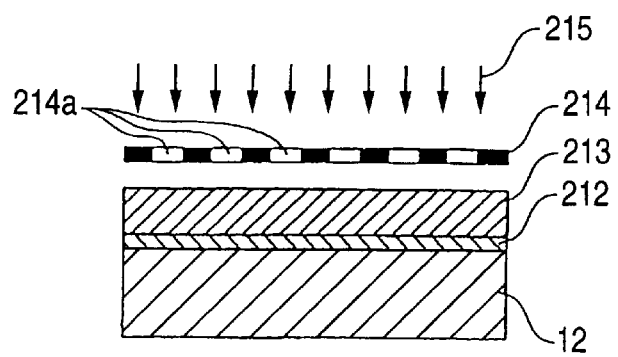

Further, the polydiacetylene derivative film may be used in the formation of the diffractive element 21 as well. In this case, as shown in FIG. 9A, after, for example, a polyethylene terephthalate film (PET film) 212 or a polyimide film is first coated with a predetermined thickness on the reverse surface of the phase difference plate 12, rubbing processing is effected by using polyester or other similar fibers. Then, a polydiacetylene derivative film 213 is formed by vacuum-depositing a diacetylene monomer on the surface of the PET film 212 and by subsequently applying ultraviolet rays thereto to effect polymerization. At this time, the polydiacetylene derivative film 213 is spontaneously oriented in the rubbing direction of the PET film 212. Next, as shown in FIG. 9C, a light shielding mask 214 is disposed on the surface of the polydiacetylene derivative film 213. This light shielding mask 214 is formed of a material having an ultraviolet shielding characteristic such as chromium, an a fine periodical grating pattern is formed as ultraviolet transmitting portions 214a. After the disposition of the light shielding mask 214, ultraviolet rays 215 of a high intensity are applied to its obverse surface. Consequently, since the applied light is transmitted through the ultraviolet transmitting portions 214a of the light shielding mask 214, regions corresponding to the fine periodical grating pattern formed on the light shielding mask 214 are exposed on the surface of the polydiacetylene derivative film 213. Here, upon application of the ultraviolet rays 215 to the polydiacetylene derivative film 213 which was colored, its irradiated portions are decomposed and become transparent. Further, the regions irradiated by the ultraviolet rays 215 come to lose their birefringence, and assume isotropy exhibiting a refractive index which is substantially similar to an ordinary-light refractive index in the colored portion. Accordingly, if the film thickness of the transparent portion and the film thickness of the colored portion are equal, a diffraction grating of a completely polarizing characteristic can be obtained.

Figure 9D:
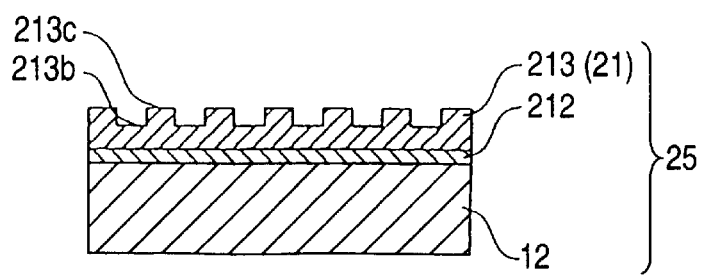

Here, if the quantity of ultraviolet rays applied is adjusted, the transparent portion (the region irradiated by the ultraviolet rays) shrinks and becomes thinner than the colored portion (the region not irradiated by the ultraviolet rays). Consequently, a periodic grating is formed by projections 213c and recesses 213b, as shown in FIG. 9D. Accordingly, since diffraction occurs due to steps on the obverse surface by the incidence of ordinary light as well, the diffractive element 21 exhibits not a completely polarizing characteristic but a partially polarizing characteristic.

The diffractive element 21 thus formed can be provided with either a completely polarizing characteristic or a partially polarizing characteristic by adjusting the quantity of ultraviolet rays applied. Further, when the diffraction characteristic with respect to ordinary light is changed, the change can be coped with by a change in the process conditions. Moreover, since a very fine diffraction grating can be formed by simply changing an exposure pattern without using a process such as etching, it is possible to fabricate the diffractive element 21 which affords a high degree of freedom in design concerning the layout of the optical system.

It should be noted that although in the above-described embodiments a description has been given of the optical pickup device 1A using the diffractive element 21 as the polarizing and separating element by way of example, the invention may be applied to the optical pickup device 1B using the cubic prism-shaped polarizing beam splitter 11 as the polarizing and separating element, as shown in FIGS. 9 and 10.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An optical pickup device comprising:
    a phase difference plate for converting states of polarization of emergent light from a laser light source and return light from an optical recording medium, the phase difference plate oriented such that an azimuth thereof is set in a range of 50° to 60° with respect to laser light for irradiating the optical recording medium which is emitted from the laser light source; and a polarizing/separating element for separating the return light from an optical axis leading from the laser light source to the optical recording medium and for guiding the return light to a photodetector on the basis of the states of polarization of the emergent light and the return light, wherein the polarizing/separating element has a partially polarizing characteristic whereby both s linearly polarized light and p linearly polarized light whose polarization directions are oriented in mutually perpendicular directions are separated from the return light toward the photodetector while including the s polarized light and the p polarized light at a fixed ratio except zero respectively, wherein both a transmittance Ts with respect to the s polarized light and a diffraction rate Rs with respect to the s polarized light are set to substantially 0.3 or more, while both a transmittance Tp with respect to the p polarized light and a diffraction rate Rp with respect to the p polarized light are set to substantially 0.3 or more.

2. The optical pickup device as set forth in claim 1, wherein the polarizing/separating element is a diffractive element having a diffraction grating formed by a polydiacetylene derivative film.

3. The optical pickup device as set forth in claim 1, wherein the phase difference plate is formed by either one of a dielectric film or polydiacetylene derivative film which are obliquely vapor-deposited.

4. The optical pickup device as set forth in claim 1, wherein the polarizing/separating element is formed integrally with the phase difference plate, and the laser light source and the photodetector are formed integrally as a light source unit.

5. The optical pickup device as set forth in claim 1, wherein a ratio between the transmittance Ts and the diffraction rate Rs is set to substantially 0.5:0.5, while a ratio between the transmittance Tp and the diffraction rate Rp is set to substantially 0.5:0.5.

6. The optical pickup device as set forth in claim 1, wherein the phase difference of the phase difference plate is set within a range of substantially 90°±20°.

7. The optical pickup device as set forth in claim 1, wherein a phase difference of the phase difference plate is set to substantially 90°.

8. The optical pickup device as set forth in claim 7, wherein the azimuth of the phase difference plate is set to about 55°.

9. The optical pickup device as set forth in claim 1, wherein the phase difference of the phase difference plate is set a range of substantially 90°±20°, and the azimuth of the phase difference plate is set with a phase difference of 50° to 60°.

10. The optical pickup device as set forth in claim 9, wherein the azimuth of the phase difference plate is set to about 55°.

* * * * *